March 4, 1958     J. S. OSTROWSKI     2,825,377
SHREDDER FOR LEAVES

Filed March 13, 1956     3 Sheets-Sheet 1

INVENTOR.
John S. Ostrowski
BY *Victor J. Evans & Co.*

ATTORNEYS

March 4, 1958     J. S. OSTROWSKI     2,825,377
SHREDDER FOR LEAVES
Filed March 13, 1956     3 Sheets-Sheet 2
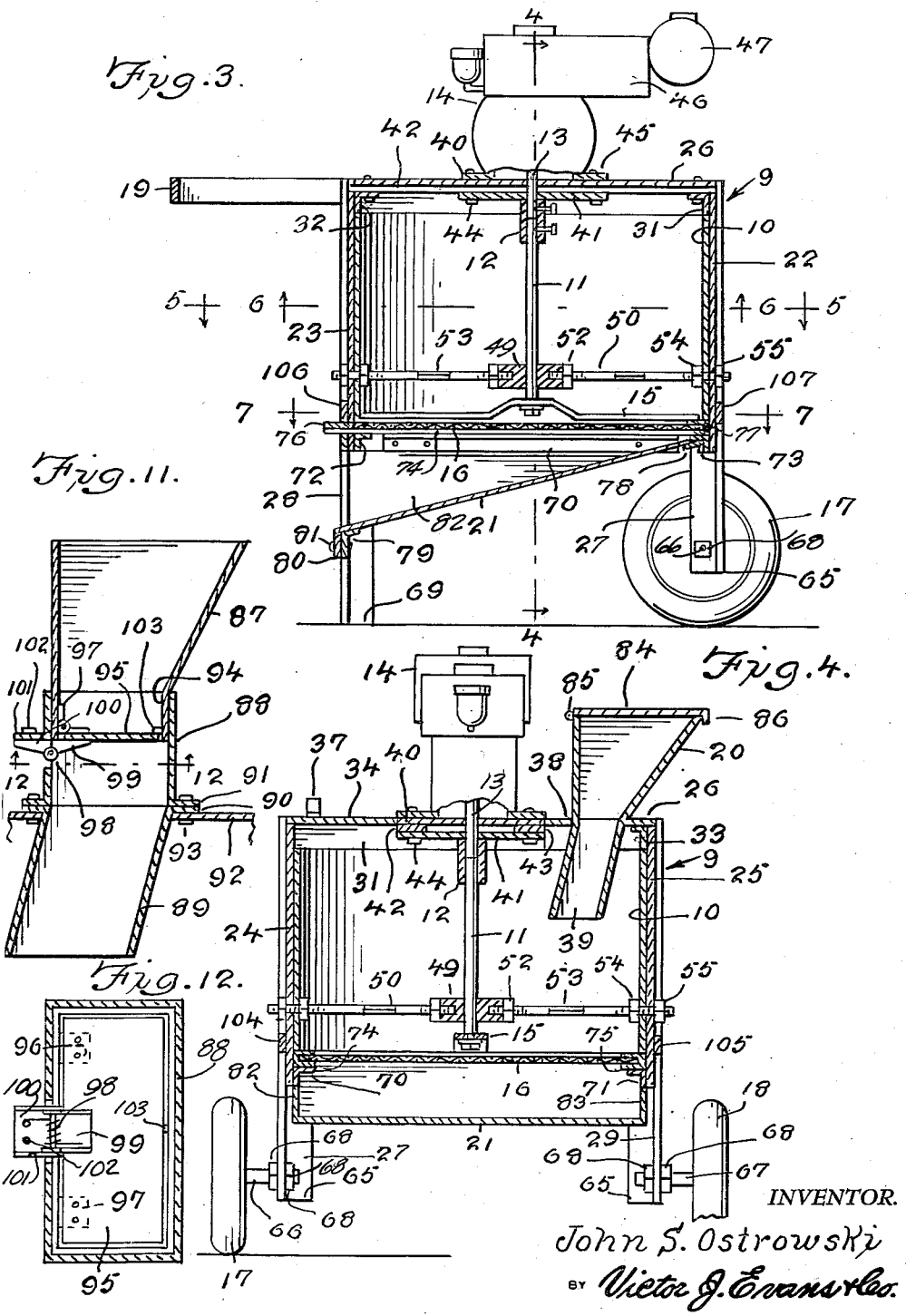
INVENTOR.
John S. Ostrowski
BY Victor J. Evans & Co.
ATTORNEYS March 4, 1958  J. S. OSTROWSKI  2,825,377
SHREDDER FOR LEAVES
Filed March 13, 1956  3 Sheets-Sheet 3
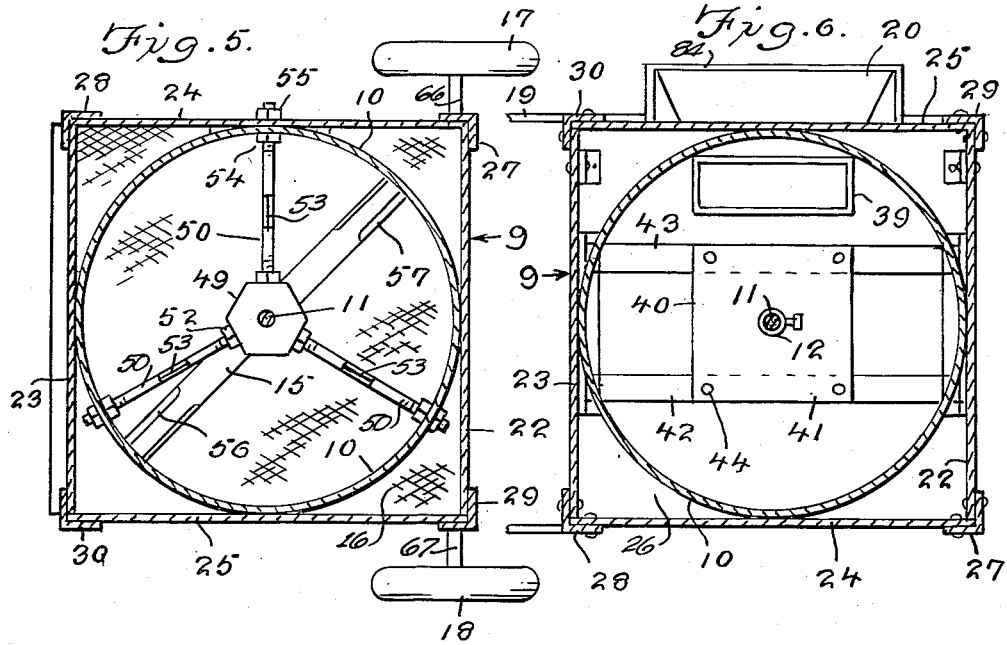
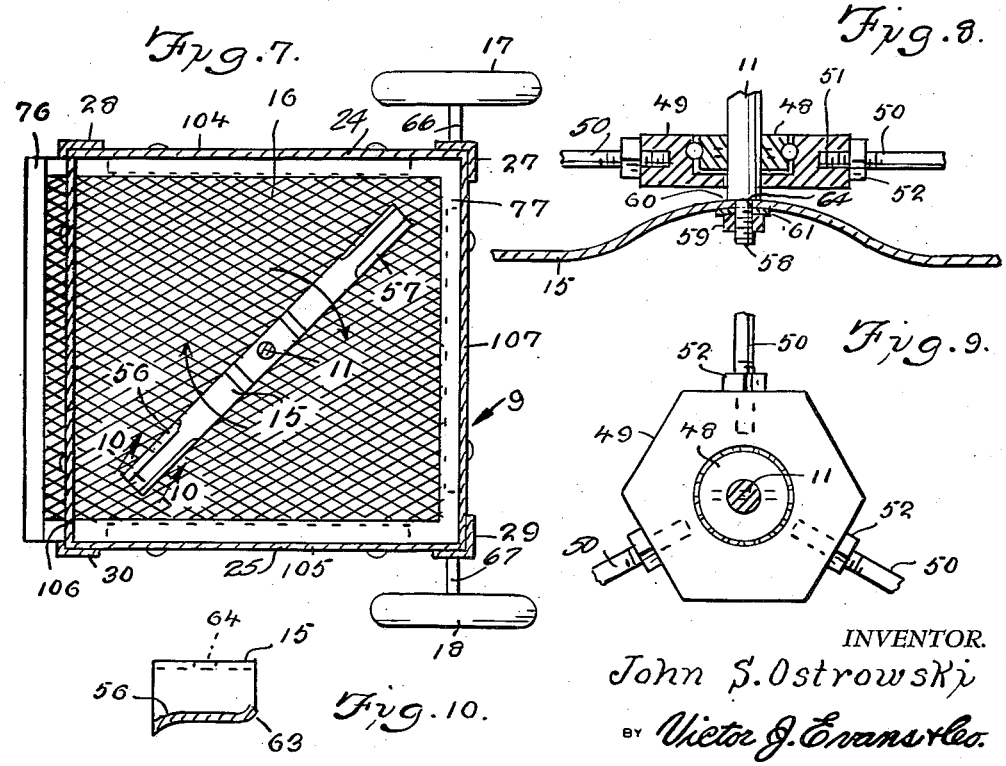
INVENTOR.
John S. Ostrowski
BY *Victor J. Evans & Co.*
ATTORNEYS

United States Patent Office 2,825,377
Patented Mar. 4, 1958

2,825,377
SHREDDER FOR LEAVES
John S. Ostrowski, Waterbury, Conn.

Application March 13, 1956, Serial No. 571,262

3 Claims. (Cl. 146—192)

This invention relates to machines of the disposal type wherein products deposited therein are shredder or pulverized, and in particular a machine for shredding leaves whereby leaves deposited therein are reduced to small particles that are adapted to be assimilated with the soil when returned to the ground.

The purpose of this invention is to provide means for utilizing accumulations of leaves wherein leaves deposited therein are shredded so that they may be assimilated with the soil when returned or broadcast over the soil.

Various attempts have been made to reduce leaves, and the like, to fertilizer by stacking the leaves and applying moisture, periodically to the stacks, however, as is requires several years for leaves to be decomposed such attempts are not considered successful and, consequently, leaves are usually raked into piles and burned. With this thought in mind this invention contemplates a shredding machine particularly adapted for reducing leaves to fine particles wherein leaves spread over the soil and particularly over grass, such as in a lawn, are readily assimilated with the soil and, eventually, have some value as fertilizer.

The object of this invention is, therefore, to provide a machine for shredding leaves wherein leaves deposited into an intake chute of the machine are reduced to relatively fine particles which are adapted to be returned to the soil.

Another object of the invention is to provide a machine for shredding leaves in which the machine is portable so that it may readily be moved from one position to another.

A further object of the invention is to provide a shredder for leaves and the like in which the shredder is of a simple and economical construction.

With these and other objects and advantages in view the invention embodies a housing having wheels on one side and a handle extended from the opposite side with an intake chute extended from the upper end and a discharge or outlet chute extended below the lower part and a rotary cutter rotatably mounted in the housing and operatively connected to a motor or the like.

Other features and advantages of the invention will appear from the following description taken in connection with the drawings, wherein:

Figure 3 is a longitudinal section through the machine taken on line 3—3 of Fig. 2 with the cutting blade operating motor shown in elevation, on the upper end.

Figure 4 is a cross section through the machine taken on line 4—4 of Fig. 3.

Figure 5 is a sectional plan through the machine taken on line 5—5 of Fig. 3, showing the leaves shredding blade and the supporting means therefor.

Figure 6 is a sectional view taken on line 6—6 of Fig. 3 looking upwardly showing the intake chute and motor mounting elements of the shredder.

Figure 7 is a sectional plan taken on line 7—7 of Fig. 3 showing the cutting bar and screen which is positioned below the bar.

Figure 8 is a sectional view with the parts shown on an enlarged scale, through the lower part of the cutter bar actuating shaft mounting with other parts of the machine omitted and with ends of the cutter bar broken away.

Figure 9 is a plan view of the cutter bar shaft mounting shown in Fig. 8.

Figure 10 is a cross section through one end of the cutting blade taken on line 10—10 of Fig. 7 with the blade shown on an enlarged scale showing, in particular, the sharp cutting edge.

Figure 11 is a vertical section through the intake chute of the machine illustrating a modficaiton wherein the chute is provided with a hinged gate or door.

Figure 12 is a section through the chute taken on line 12—12 of Fig. 11 also showing the gate or door through which leaves are deposited into the housing of the machine.

Figure 1:
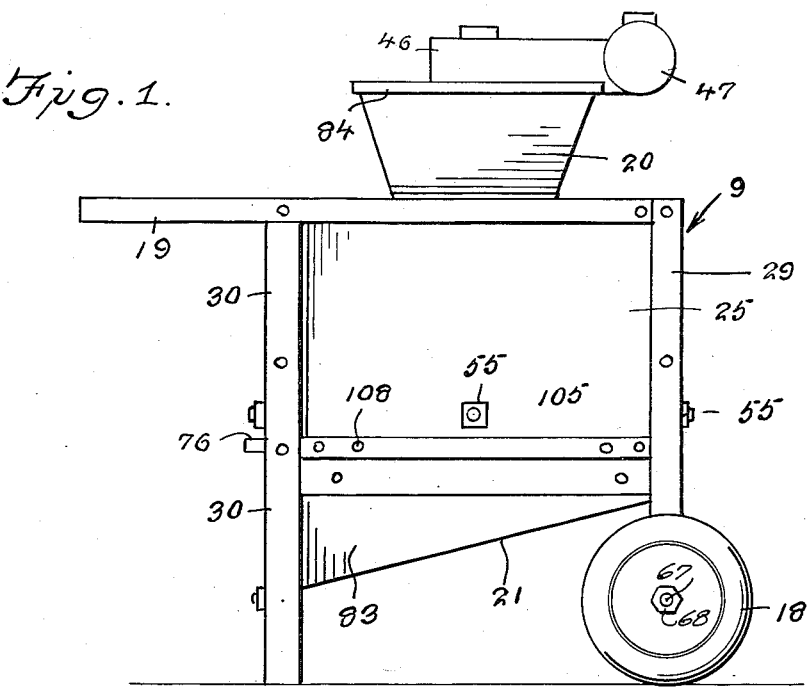
Figure 1 is a side elevational view showing the shredder for leaves and the like with the intake chute extended from the upper end and with an inclined chute for receiving the shredder leaves depending from the lower part.
Figure 2:
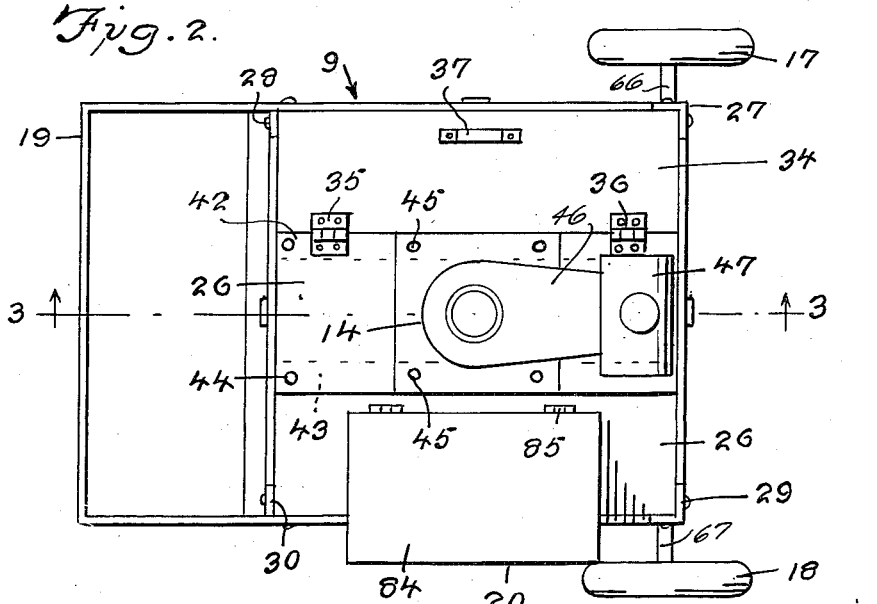
Figure 2 is a plan view of the machine for shredding leaves.

Referring now to the drawings wherein like reference characters denote corresponding parts the improved machine for shredding leaves of this invention includes the housing 9 having an inner cylinder 10, a shaft 11 rotatably mounted in the cylinder 10 and connected by a coupling 12 to a shaft 13 extended from a motor 14, a cutter bar 15 carried by the lower end of the shaft, a screen 16 positioned below the cutter bar, wheels 17 and 18 mounted on the forward end of the housing 9, a handle 19 extended from the opposite side of the housing 9, an intake hopper or chute 20 extended through the upper end of the housing 9 and an outlet chute having an inclined floor or bottom 21 positioned to receive shredded or pulverized leaves dropping through the screen 16.

The housing 9 is provided with a front wall 22, a rear wall 23, side walls 24 and 25 and a cover 26 and, as shown in Figs. 5 and 6 the side wall 24 is connected to the front wall 22 with an angle bar 27 and to the rear wall 23 with a similar bar 28 and the side wall 25 is connected to the front wall 22 with an angle bar 29 and to the rear wall 23 with an angle bar 30.

The cover 26 is positioned to rest upon a clip angle 31 on the upper edge of the front panel 22, a similar clip angle 32 at the upper end of the rear panel 23 and clip angles 33 at the sides and the cover is provided with a door 34 secured to the plate 26 with hinges 35 and 36 and having a handle 37 thereon and an opening 38 through which the lower portion 39 of the chute 20 extends, as shown in Fig. 4. The cover is reinforced with an upper plate 40 and a lower plate 41 with spacing bars 42 and 43 positioned between the cover 20 and lower plate 41 and with the plates connected with suitable fasteners 44.

The base of the motor 14 is secured in position upon the cover 26 with bolts 45 and the upper end of the motor is positioned in a cover or upper casing 46 on one end of which a fuel tank 47 is positioned.

The lower end of the shaft 11 is rotatably mounted by a bearing 48 in a block 49 and the block is supported laterally by rods 50, the inner ends of which are threaded into sockets 51 in the sides of the block 49 and these rods are secured in position by lock nuts 52. The rods or studs 50 are provided with left hand threads on one end and right hand threads on the opposite end and the intermediate parts of the rods are provided with flat sides 53 to facilitate gripping the rods with a wrench or the like.

The outer ends of the rods extend through the wall of the cylinder 10 and also through the outer walls of the housing, as shown in Fig. 3 and the rods are adjustably secured in the walls of the housing with inner lock nuts 54 and similar outer nuts 55.

The cutter bar 15, the ends of which are provided with cutting edges 56 and 57, is clamped on a stud 58 at the lower end of the shaft 11 with a nut 59 which secures the cutter bar against a shoulder 60 at the lower end of the shaft. A washer 61 may be provided between the nut and cutter bar.

The cutter bar is positioned to rotate above the screen 16, as shown in Fig. 7 and the cutting blades or sections at the ends of the bar are formed, as illustrated in Fig. 10 with sharp cutting edges on the leading sides of the bar and upwardly curved sections 63 on the trailing edges. The bar is provided with an opening 64 through which the stud 58 extends.

The angle bars 27 and 29 at the forward side of the housing extend downwardly to points 65 and stub shafts 66 and 67 are secured in legs of the angle bars with nuts 68. The angle bars 28 and 30 at the rear of the housing extend downwardly to the points 69 which are in the same plane as the lower surfaces of the wheels 17 and 18 whereby the angle bars provide supports for the back of the machine.

The wire screen 16 rests upon angle bars 70 and 71 on the lower edges of the side walls 24 and 25 and 72 and 73 on the lower edges of the rear and front walls 23 and 22, respectively and, as shown in Figs. 4 and 7 the sides of the screen are provided with support bars 74 and 75 which slide on the horizontal legs of the angle bars 70 and 71. A supporting plate 76 is also provided on the end of the screen at the rear and a similar plate 77 is provided on the screen at the front.

The pan or chute 21 for receiving the pulverized or shredded leaves is mounted on an angle bar 78 at the front and also on a similar bar 79 at the rear, the lower end being provided with a flange 80 that is secured to the angle bar 79 with fasteners 81 and the edges being provided with side walls 82 and 83, the upper edges of which are secured to the angle bars 70 and 71.

The hopper or chute 20 is provided with a cover 84 that is secured to the upper end of the chute with a hinge 85 and that is retained in the closed position with a friction finger or tab 86.

In the modification illustrated in Figs. 11 and 12 the chute is provided with an upper hopper 87, an intermediate sleeve 88 and a lower chute 89, similar to the section 39 of the hopper 20 and, as shown in Fig. 11 the section 89 is provided with a continuous flange 90, which with a similar flange 91 of the sleeve 88 is secured to a cover 92, similar to the cover 26 with bolts 93. The hopper 87 is provided with a depending flange 94 that extends into the upper end of the sleeve 88 and a gate 95, positioned in the throat or lower end of the hopper 87 is secured in position with hinges 96 and 97 and retained in the upper position, shown in Fig. 11 with a spring hinge 98. One section 99 of the spring hinge is secured to the gate 95 and the other section 100 is secured to a flange 101 with bolts 102. A stop 103 is provided at the opposite side of the hopper to limit upward movement of the gate.

The sides of the frame and housing are reinforced with horizontally disposed bars 104 and 105 and similar bars 106 and 107 are extended across the ends of the frame. The bars may be secured to the angle bars or posts, such as by welding or the bars may be retained in position by fasteners, such as the rivets 108.

It will be understood that other modifications, within the scope of the appended claims, may be made in the design and arrangement of the parts without departing from the spirit of the invention.

What is claimed is:

1. In a leaf shredding machine, the combination which comprises a square shaped housing, a vertically disposed cylinder mounted in the upper part of the housing in contact with the inner surface of the housing, a wire mesh screen removably mounted in the housing, a cover having an opening therethrough positioned on the upper end of the housing, a vertically disposed shaft rotatably mounted in the cylinder, a bearing block journalling said shaft in said cylinder, rods connected to said bearing block at their inner ends and to the cylinder and frame at their outer ends, a cutter bar carried by the lower end of the shaft and positioned in spaced relation to the upper surface of the screen, a chute extended through the opening of the cover for receiving leaves deposited into the cylinder, and a chute positioned below the screen.

2. In a shredding machine, the combination which comprises a substantially rectangular-shaped frame having corner posts connected with horizontally disposed transverse and longitudinally positioned rails, a square shaped housing mounted in said frame, a handle extended from the frame, a cylinder mounted in the housing, a wire mesh screen removably mounted in the lower end of the housing, an inclined chute positioned below the screen and also mounted in the housing, a cover having an opening therethrough mounted on the upper end of the housing and providing a cover for the cylinder, a leaf receiving chute positioned in the opening of the cover, a motor mounted on the cover and positioned with the shaft thereof vertical, a shaft operatively connected to the motor shaft and positioned in the center of the cylinder, a blade having sharp edges carried by the lower end of the shaft and positioned in spaced relation to the screen, a bearing through which the lower end of the shaft extends, and adjustable arms connecting the bearing to the wall of the cylinder and housing.

3. In a shredding machine, the combination which comprises a substantially rectangular-shaped frame having corner posts connected with horizontally disposed transverse and longitudinally positioned rails, a square shaped housing mounted in said frame, a handle extended from the frame, a cylinder mounted in the housing, a wire mesh screen removably mounted in the lower end of the housing, an inclined chute positioned below the screen and also mounted in the housing, a cover having an opening therethrough mounted on the upper end of the housing and providing a cover for the cylinder, a leaf receiving chute having a spring actuated gate therein extended through the opening of the cover, a motor mounted on the cover and positioned with the shaft thereof vertical, a shaft operatively connected to the motor shaft and positioned in the center of the cylinder, a blade having sharp edges carried by the lower end of the shaft and positioned in spaced relation to the screen, a bearing through which the lower end of the shaft extends, and adjustable arms connecting the bearing to the wall of the cylinder and housing.

References Cited in the file of this patent

UNITED STATES PATENTS

| Number | Name | Date |
| --- | --- | --- |
| 982,942 | Emmott et al. | Jan. 31, 1911 |
| 1,735,226 | Whitney et al. | Nov. 12, 1929 |
| 2,082,419 | Rietz | June 1, 1937 |
| 2,637,359 | Taylor | May 5, 1953 |
| 2,661,584 | Ronning | Dec. 8, 1953 |
| 2,712,211 | Smith et al. | July 5, 1955 |
| 2,756,001 | Kemp | July 24, 1956 |